United States Patent Office 3,329,743
Patented July 4, 1967

3,329,743
LACQUER PROCESS FOR PREPARING SMALL DIAMETER NITROCELLULOSE PARTICLES
Ralph E. Coffee, Alton, Ill., assignor to Olin Mathieson Chemical Corporation, a corporation of Virginia
No Drawing. Filed May 15, 1963, Ser. No. 281,383
17 Claims. (Cl. 264—3)

This invention relates to a novel process for preparing propellant powder particles of small diameter.

U.S. Patent No. 2,027,114, granted Jan. 7, 1936 to F. Olsen et al. discloses a process of manufacturing smokeless powder wherein a lacquer of nitrocellulose in a suitable solvent is agitated in a non-solvent medium such as water to form spherical drops of lacquer, and the resulting suspension is then heated to evaporate the solvent from the lacquer drops, yielding solid spherical shaped nitrocellulose particles suspended in the non-solvent medium. Such a process of manufacturing propellant powder has come to be known to those skilled in the art as the "globular powder" process. Although this process has found wide acceptance in the industry, one problem encountered in carrying out this process is the difficulty in controlling the uniformity of the particle size and the specific gravity of the product.

Nitrocellulose powder particles having a diameter averaging about 0.020 inch are very effective for use as the propellant in small arms ammunition. In recent times spherical particles having a diameter of less than about 0.016 inch and formed of nitrocellulose having finely divided particles of high explosive materials such as cyclotrimethylenetrinitramine (RDX), cyclotetramethylenetetranitramine (HMX), and the like, dispersed throughout the spherical particles have been used extensively as solid propellant casting powders.

In order to obtain particles of this type from the conventional globular powder process, the solid powder particles must be screened to obtain a fraction of the desired particle size. Generally, only a small fraction of the particles has an average diameter of less than about 0.016 inch. Modifications of the globular powder process have been developed in order to increase the percentage of small diameter particles. One modification involves the use of severe agitation of the suspension of lacquer globules to reduce the size of the lacquer globules. While this technique has increased the proportion of small diameter particles ultimately produced, nevertheless large expensive agitation equipment is required to do this. In addition uniformity of the particle size of the product is not always attained, and a screening step must be employed to separate oversized particles from the product.

It is a primary object of this invention to overcome the disadvantages inherent in previously known processes for preparing nitrocellulose particles of small diameter.

Another object of the invention is to provide an improved process for preparing nitrocellulose particles of small diameter.

Still another object of the invention is to provide a novel technique for reducing the diameter of lacquer globules in the globular powder process to ultimately yield solid nitrocellulose particles of small diameter.

It is another object of the invention to provide a process for improving the uniformity of the particle size of the nitrocellulose particles produced in the globular powder process.

A further object of the invention is to provide novel nitrocellulose particles of small diameter and relatively high specific gravity.

Still another object of the invention is to provide an improved process for preparing spherical granules having a diameter of less than about 0.016 inch and formed of nitrocellulose having finely divided particles of a crystalline high explosive compound distributed throughout.

These and other objects of the invention will be apparent from the following detailed description thereof.

In accordance with this invention the above mentioned objects can be accomplished by agitating a lacquer of nitrocellulose dissolved in a suitable solvent in the presence of a non-solvent medium with sufficient force to form small globules of the lacquer, and for sufficient time to permit rounding of these globules, and thereafter adding to the resulting suspension additional solvent in an amount sufficient to cause the breakup of the globules into globules of smaller diameter. Solvent is then evaporated from the resulting suspension of the smaller lacquer globules, thereby yielding a suspension of small diameter solid, substantially spherical, particles of nitrocellulose in the non-solvent medium. The small diameter nitrocellulose solids recovered from the suspension are of substantially uniform particle size and uniform specific gravity.

More in detail, nitrocellulose-base lacquer is prepared by dissolving water-wet nitrocellulose in a volatile solvent therefor. The nitrocellulose may be wholly or partially purified fibrous nitrocellulose in the form of nitrated flakes, linters, or wood pulp; it may be dense colloided nitrocellulose in the form of existing powder, whether fresh or deteriorated, or of good, poor, or indifferent stability; it may be nitrocellulose from other processes such as dust and mud or bulk powder and cannon powder. The nitrocellulose may be of any suitable degree of nitration, such as having a nitrogen content between about 11.0 and about 13.9 percent by weight.

Any volatile solvent for nitrocellulose which has a boiling point below that of water or other non-solvent vehicle and which substantially immiscible or only partially immiscible with water may be employed in the preparation of the lacquer. Typical examples of suitable solvents of this type include ethyl acetate, methyl ethyl ketone, ethyl formate, isopropyl acetate, diethyl ketone and mixtures thereof.

Sufficient solvent is used to dissolve water-wet nitrocellulose in the preparation of the lacquer to provide a viscosity of between about 3 and about 10, and preferably between about 5 and about 7 seconds, as measured by the following method: an aluminum rod $5/16$ inch in diameter weighing 21 grams, having a flat end and a circumferential mark $25/16$ inches from the flat end, is placed upon a body of the lacquer flat end down, the temperature of the lacquer being 68° C., and the time required for the rod to sink to the $25/16$ inch depth mark is considered the viscosity of the lacquer. Lacquer viscosities within the above mentioned ranges are generally obtained by employing sufficient solvent to provide a weight ratio of solvent to nitrocellulose of between about 6:1 and about 15:1, and preferably between about 7:1 and about 10:1.

Sufficient water should be present in the lacquer to form emulsified droplets of water without forming an additional separate aqueous phase, and yielding a homogeneous dispersion of water droplets in the lacquer. A proportion of water in the range between about 3 percent and about 30 percent by weight of the nitrocellulose in the lacquer has been found to be most efficacious, but other proportions can be employed so long as water is retained as a homogeneous emulsion in the lacquer. The water content of the emulsion may be derived from the water added with the "wet" nitrocellulose but if sufficient water is not present with the nitrocellulose, additional water may be added separately to provide a water concentration in the lacquer within the above mentioned range.

Lacquer prepared in accordance with the above defined procedure is then admixed with a non-solvent medium which is substantially immiscible with the lacquer. Any suitable mixing vessel provided with a mechanical agitator or other mixing device may be employed in the preparation of the suspension of lacquer globules in the non-solvent medium. The non-solvent medium is preferably an aqueous medium saturated with the solvent and containing a protective colloid and/or other additives which are described more fully below. Addition of the solvent to the water prior to mixing of the lacquer and non-solvent medium prevents precipitation of nitrocellulose gel due to extraction of the solvent from the globules by the water. The protective colloid inhibits coalescence of the globules once they are formed.

Various materials may be added to the lacquer or nonsolvent medium prior to or during the mixing. A suitable protective colloid such as corn starch, gum arabic, animal bone glue, dextrin, bentonite, or the like, is added to the non-solvent medium in a proportion equivalent to between about 0.1 and about 0.5 percent by weight of the water present in the mixture. Liquid high energy compounds such as triethylene glycol dinitrate, diethylene glycol dinitrate and nitroglycerin may be added with the lacquer in a proportion up to about 50 percent by weight of the nitrocellulose in order to increase the burning rate of the solid powder particles ultimately produced and to serve as a plasticizer when the powder is used as a component of solid propellants.

When it is desired to prepare a product suitable for use as a solid propellant casting powder, a crystalline high explosive composition in finely divided form may be added to the lacquer or non-solvent medium prior to or during mixing. Any crystalline high explosive composition which is substantially insoluble in the water immiscible solvent used in preparing the lacquer of nitrocellulose can be used in the preparation of the novel rocket casting granules of this invention. Typical examples of suitable explosive compositions include HMX (cyclotetramethylenetetranitramine), RDX (cyclotrimethylenetrinitramine), PETN (pentaerythritol tetranitrate), 2,4,6-trinitrophenylmethylnitramine, and mixtures thereof.

HMX is the preferred crystalline high explosive composition because of its high oxygen content. It is well known that HMX exists in the form of several species of crystals, i.e., it exhibits polymorphism in the solid state. The four known crystal forms of HMX are the alpha, beta, gamma and delta isomorphs. The commercial form of HMX predominates in the beta-isomorph, which is one stable at ordinary temperatures and pressures, and also one which is the safest to handle from the impact sensitivity standpoint. Recent findings indicate that the beta-isomorph may undergo a transition to the other forms (mainly to the alpha form) in the presence of liquid ingredients, and under the environmental conditions existing in certain solid rocket propellant formulations. Such a transition results in a mixture of polymorphs of HMX which is of greatly increased sensitivity to detonation by impact, which increases the hazards during handling. It is believed that the individual HMX particles in the novel granules of the instant invention are immobilized within the granule matrix during the initial phases of preparing the rocket propellant formulation, and transition of the beta-isomorph to an undesired form is thus markedly inhibited.

Crystalline high explosive compositions in finely divided form, for example, particles having a diameter between about 0.1 and about 150 microns, and preferably between about 1 and about 30 microns are used in the preparation of the novel granules. However, particles of any size that can be uniformly dispersed in a lacquer containing nitrocellulose under the reaction conditions described more fully below may be employed.

Particles of the explosive composition are preferably admixed with the nitrocellulose base lacquer as an aqueous slurry containing, for example, between about 2 and about 10 percent by weight of solids, but a higher or lower concentration of solids in the slurry may be employed if desired. Explosive compositions such as HMX are available commercially as alcohol slurries or as aqueous slurries containing alcohol. If alcohol is present in the slurry, it should be removed by distillation or the like prior to adding the HMX to the lacquer. Dry particles of the explosive composition may be added to an aqueous dispersion of the lacquer, if desired, but more severe agitation is required to obtain the desired degree of dispersion of the particles in the lacquer.

The lacquer is preferably made by adding solid nitrocellulose and the volatile solvent to the non-solvent medium in a suitable mixing vessel and agitating the ingredients. When solid nitrocellulose is contacted with the volatile solvent in this manner, the solvent dissolves the nitrocellulose to form a lacquer. Agitation of the resulting lacquer in the aqueous slurry causes formation of spherical lacquer globules which are dispersed in the aqueous medium. In addition, substantially all of the particles of explosive composition, if present in the aqueous slurry, become dispersed in the lacquer globules. In another embodiment, the lacquer is prepared separately by admixing solid nitrocellulose with the volatile solvent at a temperature below the boiling point of the solvent until substantially all of the nitrocellulose is dissolved. The resulting lacquer is then admixed with the aqueous slurry to form substantially spherical lacquer globules as described above. If desired, the lacquer may be formed in water or added to water in a suitable mixing vessel, and after formation of lacquer globules in the water, dry particles of the explosive composition, or aqueous slurry thereof, may be added to the aqueous suspension of lacquer globules in the mixing vessel.

Sufficient water should be present during mixing of the lacquer and aqueous slurry and during formation of the lacquer globules to provide a water content in the non-solvent medium equivalent to a weight ratio of water to nitrocellulose of between about 25:1 and about 180:1, and preferably between about 50:1 and about 80:1.

When a crystalline high explosive is employed, sufficient crystalline high explosive composition in finely divided form is mixed with the nitrocellulose lacquer to provide a weight ratio, on a dry basis, of explosive composition to nitrocellulose of between about 1:1 and about 9:1, and preferably between about 2:1 and about 6:1.

Mixing of the lacquer and aqueous slurry, and formation of the globules may be carried out at a temperature between about 10° and about 75° C., or any temperature above the freezing point of the mixture and below the boiling point of the volatile solvent. Pressures above atmospheric pressure may be employed during mixing to inhibit evaporation of the solvent at higher temperatures.

Agitation of the lacquer in the aqueous slurry for a period of at least about ½ hour, and as long as 1½ hours or more is generally necessary to form globules of the desired size and shape and, if utilized, to effect substantially complete dispersion of the particles of high explosive composition or other solid additives in the lacquer globules.

If desired, other materials, for example, stabilizers such as diphenyl amine, 2-nitrodiphenyl amine, ethyl centralite, and the like; deterrents such as dinitrotoluene, dibutyl phthalate, diphenyl phthalate, ethyl centralite and the like; and other modifying agents such as lead compounds, carbon black, powdered aluminum, and the like, may be included in the lacquer prior to mixing.

In addition, other substances which are volatile non-solvents for nitrocellulose, and which are miscible with the volatile solvent for nitrocellulose and immiscible with water may be added as a diluent. Typical examples of suitable diluents include the liquid hydrocarbons, xylene, benzene, pentane, hexane, heptane, octane, nonane, decane, undecane, dodecane, and other compatible water-immiscible diluents such as isopropyl ether propyl ether, cyclohexane, methyl cyclohexane, toluene, and the like.

After rounded globules of lacquer are formed and become substantially uniformly dispersed in the non-solvent medium, an additional amount of solvent for the nitrocellulose is slowly added with agitation to the suspension. The proportion of solvent is generally between about 20 and about 75, and preferably between about 30 and about 71 percent by weight of the solvent initially present in the lacquer. When less than about 20 percent of additional solvent is employed, there is no noticeable change in the diameter of the globules. When greater than about 75 percent of additional solvent is employed, no further reduction in size is noted due to the tendency of the lacquer globules to float and coalesce.

The rate required to add the additional portion of solvent will vary with the amount of lacquer suspension treated, but is generally between about 0.2 and about 0.9, and preferably between about 0.4 and about 0.7 pounds per minute per 100 pounds of nitrocellulose. It is not essential that the same solvent be added at this point in the process that was employed in the preparation of the lacquer, but it is preferred to employ the same nitrocellulose solvent throughout the process in order to facilitate handling of the solvent. Addition of the solvent in this manner causes a breakdown in the lacquer globules and additional lacquer globules are formed having a diameter substantially less than the original globules. Breakdown of the lacquer globules is substantially complete immediately after all of the additional solvent has been added. However, agitation of the resulting suspension may be continued as long as about 120 minutes after completion of the solvent addition to increase the uniformity of the diameter of the globules.

Evaporation of the solvent from the lacquer globules is then begun by increasing the temperature of the suspension up to the distillation temperature by bubbling air or other inert gas through the suspension, or otherwise. If the specific gravity and porosity of the nitrocellulose product is not critical, evaporation may be continued until complete solidification of the lacquer globules is obtained, and the resulting solids are then separated from the non-solvent medium, and dried and further processed if desired. However, in most applications the uniformity of the specific gravity of the solid product is important, especially when the product is employed as a solid propellant casting powder. Close control of the specific gravity of the solid particles is readily attained in the process of this invention by the following novel evaporation technique. In this embodiment, the suspension of lacquer globules, after addition of the solvent has been completed, is treated to remove sufficient volatile solvent to effect partial hardening of the lacquer globules.

Some of the factors affecting the proportion of volatile solvent which must be removed in order to effect this partial solidification include the solvent employed, the weight ratio of solvent to nitrocellulose finally present, and if an explosive composition is employed, the weight ratio of explosive composition to nitrocellulose initially present. For example, when the volatile solvent is ethyl acetate, the weight ratio of solvent to nitrocellulose originally present is about 7.5:1 and the weight ratio of explosive composition to nitrocellulose is about 3:1, then the proportion of ethyl acetate which must be removed to effect partial solidification of the globules is between about 35 and about 45 percent by weight of the solvent initially present. However, greater or lesser proportions may be removed if the above mentioned factors are varied.

Partial removal of the solvent is preferably effected by air stripping, wherein air is bubbled through the aqueous suspension of lacquer globules by means of a sparging system while agitating the suspension. Partial solidification of the lacquer globules in this manner inhibits coalescense and/or distortion of the spherical globules during subsequent processing steps, and increases the specific gravity of the solid nitrocellulose particles ultimately produced. If desired, partial removal of the volatile solvent may be effected by distillation or other solvent separation techniques, either individually or in combination with the air stripping technique.

After partial removal of the solvent and partial solidification of the globules are effected, a dewatering agent is admixed with the aqueous suspension. Typical examples of suitable dewatering agents include water soluble metal salts such as sodium sulfate, magnesium sulfate, aluminum sulfate, barium nitrate, sodium chloride or sodium nitrate, and mixtures thereof. The dewatering agent is preferably dissolved in water to form a solution having a concentration of at least about ten percent by weight up to about the saturation concentration, and the resulting solution is then added to the aqueous globule suspension with agitation. However, the dewatering agent may be added in dry powder form to the aqueous suspension of globules, if desired. The proportion of dewatering agent added is equivalent to a weight ratio of water (total weight of water present in the aqueous suspension of globules plus water in the solution of dewatering agent) to dewatering agent (dry basis) of between about 50:1 and about 20:1. Addition of the dewatering agent to the aqueous suspension increases the specific gravity of the rocket casting granules ultimately produced. The dewatering agent is added slowly to the aqueous dispersion of globules, the total requirement being added over a period of at least about 15 minutes, and preferably between about 30 minutes and about 60 minutes. Agitation of the dispersion is continued after addition of the dewatering agent for a period of between about 1 hour and about 5 hours to effect substantially complete dispersion of the dewatering agent throughout the system. During this latter agitation period the dispersion is heated to a temperature above the boiling point of the volatile solvent but below the boiling point of water to effect substantially complete removal of the solvent and complete solidification of the globules into solid, substantially spherical, granules. The resulting aqueous slurry of solid granules is dewatered to remove the aqueous medium by decanting or other suitable solid-liquid separating technique, and the granules are washed with fresh water to remove the dewatering agent and other water soluble substances that may adhere to the granules.

The use of the above mentioned dewatering agents is described in more detail in U.S. Patent No. 2,160,626, granted to Harold F. Schaefer on May 30, 1939. In accordance with the process of this patent, addition of the desensitizing agent to the non-solvent medium causes extraction of water from the lacquer globules, thereby resulting in less porous particles of a high specific gravity. Also, if particles of low specific gravity are desired the desensitizing agent is added to and dispersed in the lacquer prior to mixing with the non-solvent medium. In the latter case, the desensitizing agent causes the transfer of water from the non-solvent medium into the lacquer globules, which results in solid nitrocellulose particles of high porosity and low specific gravity.

The moist granules, after washing, are dried, or if desired, may be glazed. In addition, the granules may be surface coated with any of the above mentioned deterrents or modifiers. If desired, the above mentioned deterrents or modifiers may be added to the suspension of solids immediately after distillation of the solvent or in a separate aqueous suspension, or added to the dried powder in a heated tumbling barrel to effect surface coating.

Because the novel solid particles are substantially uniform in size, having an average diameter generally within the range between about 0.009 and about 0.013, the screening step can be eliminated and the particles may be used directly as a propellant in small arms ammunition. If finely divided particles of crystalline high explosive compounds are dispersed throughout the particles, the product may be employed directly as a solid propellant casting powder in accordance with the procedure set forth in the copending application of Thomas F. McDonnell and Ralph E. Coffee, Ser. No. 176,,424, filed Feb. 28, 1962. It is normal practice, however, to screen the powder on an 0.025 inch opening screen to remove tramp iron or other foreign material which may accidentally get mixed with the powder during processing.

The novel granules of the instant invention markedly increase the fluidity of castable rocket propellant formulations containing them because of their spherical shape. When irregular shaped or cylindrical shaped high explosive compositions, either coated or uncoated, as in the prior art, are used in the preparation of the propellants, the fluidity of the propellant mixture is substantially reduced. In addition, when the novel granules of this invention are employed, a higher concentration of explosive composition can be incorporated in the propellant formulation and easily mixed to obtain a substantially uniform dispersion throughout the formulation, as compared to forms of explosive compositions available heretofore. The novel granules of the instant invention also increase the pot life of the propellant during mixing over similar compositions in which this crystalline high explosive compound is added separately as a finely divided powder.

The following examples are presented to further illustrate the invention without any intention of being limited thereby. All parts and percentages are by weight unless otherwise specified.

*Example 1*

A mixing vessel provided with a mechanical agitator and external heating means was employed in the preparation of smokeless powder particles in accordance with the process of this invention. Added to the mixing vessel were 300 parts of nitrocellulose (13.2 percent nitrogen), 3 parts of diphenylamine and 2700 parts of water. These ingredients were agitated and then ethyl acetate (1026 parts) was added with stirring to the resulting slurry which was then heated to 68° C. Stirring was continued for one hour at a temperature of 68° C. During this time lacquer globules formed and became suspended in the water, as is normal for the conventional "globular powder" process. A protective colloid comprised of 10 parts of animal bone glue emulsified in 200 parts of water was added to the agitated suspension in the mixing vessel. Addition of the protective colloid caused the formation of smaller globules of lacquer which were suspended in the water medium, in accordance with the procedure of the conventional "globular powder" process. Additional ethyl acetate (405 parts) was then slowly added to the agitated suspension of globules at the rate of about 9 parts every 5 minutes. Addition of the ethyl acetate in this manner caused a significant decrease in the diameter of the lacquer globules to be effected as the additional ethyl acetate solvent was added.

The resulting suspension was then heated to effect distillation of the ethyl acetate in an amount equivalent to about 405 parts of ethyl acetate. Distillation was then stopped and about 105 parts of sodium sulfate dissolved in about 200 parts of water was then added to the suspension in the mixing vessel with agitation. The resulting suspension was then heated until substantially all of the remaining ethyl acetate solvent was distilled off, yielding an aqueous suspension of hardened grains of nitrocellulose. The aqueous phase was decanted and the wet grains were heated to dryness. The nitrocellulose grains produced by this technique had an average diameter of about 0.009 inch and a specific gravity of about 1.54.

*Example II*

To the mixing vessel of Example I were added 522 parts of nitrocellulose (12.6 percent nitrogen), 115 parts of nitroglycerin, 7.8 parts of 2-nitrodiphenylamine, 1714 parts of HMX, and 28,500 parts of water. These ingredients were agitated and 3550 parts of ethyl acetate were then added with agitation, while heating to a temperature of 68° C. After heating the mixture at this temperature for about 1 hour, a smooth lacquer suspension in water was created. At the end of this period a solution of 150 parts of animal bone glue in 1500 parts of water was admixed with the lacquer suspension to serve as a protective colloid and effect the initial breakdown of the lacquer into propellant grain globules. After the initial graining had been completed, 2500 parts of ethyl acetate were added continuously to the mixture over a period of 105 minutes. A significant decrease in the diameter of the lacquer grains was observed as the addition of ethyl acetate progressed.

The resulting suspension was then heated to a temperature of about 70° C. to effect distillation of a portion of the solvent. Distillation was stopped after about 3600 parts of ethyl acetate solvent had been removed. An aqueous solution of 1350 parts of sodium sulfate dissolved in 2000 parts of water was then added to the suspension of lacquer globules to effect dewatering of the lacquer globules. The suspension was then heated to a temperature of about 70° C. until substantially all of the remainder of the ethyl acetate was distilled off, and the lacquer globules were then hardened to form solid nitrocellulose grains. The resulting aqueous suspension of nitrocellulose grains was dewatered and the wet grains were heated to dryness. The resulting grains, which were comprised of finely divided particles of HMX suspended in a matrix of nitrocellulose, had an average diameter of about 0.0096 inch. These particles were approximately 50 percent smaller than particles made by a process in which additional solvent is not added after the initial graining. The finely divided particles of HMX firmly embedded in a matrix of nitrocellulose are efficaciously employed as a solid propellant casting powder.

*Examples III–IV*

Two additional tests were carried out to show the effect of the proportion of additional solvent on particle size of the nitrocellulose grain. Employing a procedure similar to Example II, two batches of nitrocellulose grains were prepared in which the additional solvent added after graining were 45 percent and 62.7 percent, respectively, of the ethyl acetate solvent initially in the batch. The table below sets forth the proportions of ingredients and the particle size of the product obtained in these two tests as well as Example II. In addition the table also shows these data for a comparative test, indicated as "C.T." in the table, in which no additional solvent was added after initial graining.

| Example | Nitrocellulose, Parts | Water, Parts | Initial Solvent, Parts | Solvent Added After Graining | | Average Particle Size, inch |
|---|---|---|---|---|---|---|
| | | | | Parts | Percent | |
| II | 522 | 28,500 | 3,550 | 2,500 | 70.4 | 0.0096 |
| III | 522 | 28,500 | 3,350 | 2,100 | 62.7 | 0.0115 |
| IV | 522 | 28,500 | 3,700 | 1,660 | 45.0 | 0.0121 |
| C.T. | 522 | 28,500 | 3,950 | 0 | 0 | 0.0183 |

The above examples clearly demonstrate the remarkable decrease in the average size of the product that is effected when solvent is added after the initial graining. A comparison of Example III with the results obtained in the comparative test show that the average diameter of the product in Example III was nearly 60 percent that of the average diameter of the particles obtained in the comparative test.

Various modifications of the invention may be employed, some of which have been referred to above, without departing from the spirit of this invention. What is desired to be secured by Letters Patent is:

1. The process for reducing the diameter of lacquer globules, suspended in an aqueous medium, said lacquer being a solution of nitrocellulose in a substantially water immiscible solvent therefore, which comprises admixing additional solvent with the suspension of lacquer globules, the proportion of additional solvent being between about 20 and about 75 percent by weight of the solvent initially present in said lacquer globules, and agitating the additional solvent with the suspension until the desired reduction in the diameter of lacquer globules is obtained.

2. The process of claim 1 wherein the additional portion of solvent is slowly added to the suspension.

3. The process of claim 1 wherein the additional solvent is added to the suspension at a rate of between about 0.2 and about 0.9 pounds of solvent per minute per 100 pounds of nitrocellulose present.

4. The process of claim 1 wherein said solvent is ethyl acetate.

5. In the globular powder process, wherein a suspension of globules of nitrocellulose lacquer in a non-solvent medium is heated to distill solvent from the lacquer to form solid particles of nitrocellulose suspended in the non-solvent medium, the improvement which comprises admixing with the suspension, prior to distillation, a portion of solvent equivalent to between about 20 and about 75 percent by weight of solvent initially present in the globules of nitrocellulose lacquer, at the same time agitating said admixture, whereby the diameter of the globules is decreased, and heating the resulting suspension to distill solvent from the globules, thereby yielding a suspension of solid nitrocellulose particles in the non-solvent medium, and recovering the solid nitrocellulose particles from the non-solvent medium.

6. The process of claim 5 wherein the solid nitrocellulose particles have an average diameter of less than about 0.016 inch.

7. The process of claim 5 wherein said solvent is ethyl acetate.

8. The process of claim 5 wherein said additional solvent is added at a rate between about 0.2 and about 0.9 pound of solvent per minute per 100 pounds of nitrocellulose present.

9. The process of claim 5 wherein finely divided particles of crystalline high explosive are suspended in said globules of nitrocellulose lacquer prior to the solvent addition step.

10. In the globular powder process wherein solvent is evaporated from a suspension of globules of nitrocellulose lacquer in a non-solvent medium to form solid particles of nitrocellulose suspended in the non-solvent medium, the improvement which comprises admixing with the suspension prior to evaporation, a portion of solvent equivalent to between about 20 and about 75 percent by weight of the solvent initially present in the lacquer, at the same time agitating said admixture, whereby the diameter of the lacquer globules is decreased, evaporating in an initial evaporating step a sufficient proportion of said solvent to effect partial solidification of said globules, admixing a dewatering agent with the resulting aqueous suspension of partially solidified globules, evaporating in a final evaporating step the remainder of the solvent from the globules, whereby solid spherical nitrocellulose particles are formed in the aqueous medium, and recovering said solid spherical nitrocellulose particles therefrom.

11. The process of claim 10 wherein the initial evaporation step is effected by bubbling air through the suspension and wherein the final evaporation step is effected by heating the suspension to distill off the solvent therefrom.

12. The process of claim 10 wherein said solid spherical nitrocellulose particles have an average diameter of less than about 0.016 inch.

13. The process of claim 10 wherein said solvent is ethyl acetate.

14. The process of claim 10 wherein nitroglycerin is added to said lacquer in a proportion equivalent to between about 1 and about 50 percent by weight of said nitrocellulose.

15. The process of claim 10 wherein finely divided particles of HMX are suspended in said nitrocellulose globules prior to the solvent addition step.

16. The process of claim 10 wherein finely divided particles of RDX are suspended in said nitrocellulose globules prior to said solvent addition step.

17. In the globular powder process wherein nitrocellulose is dissolved in a volatile solvent to form a lacquer and the lacquer is agitated in the presence of a nonsolvent medium with sufficient force to form a suspension of globules of the lacquer and for sufficient time to permit rounding of the globules, the improvement which comprises reducing the diameter of the globules by admixing additional solvent with said suspension while continuing said agitation, the proportion of said additional solvent being between about 20 and about 75 percent by weight of the solvent initially present in the globules, and continuing admixing and agitating the additional solvent with the suspension until the desired reduction in the diameter of lacquer globules is obtained.

References Cited

UNITED STATES PATENTS

| | | | |
|---|---|---|---|
| 2,027,114 | 1/1936 | Olsen et al. | 264—3 |
| 2,740,704 | 4/1956 | O'Neill et al. | 264—3 |
| 2,771,352 | 11/1956 | O'Neill | 264—3 |
| 2,830,886 | 4/1958 | O'Neill et al. | 264—3 |
| 2,885,736 | 5/1959 | O'Neill | 264—3 |

L. DEWAYNE RUTLEDGE, *Primary Examiner.*

CARL D. QUARFORTH, *Examiner.*